(No Model.)  4 Sheets—Sheet 1.

C. V. WOERD.
MACHINE FOR ROUGHING OUT PINIONS FOR WATCHES.

No. 320,992.  Patented June 30, 1885.

Witnesses
A. L. White
H. Brown

Inventor.
C. V. Woerd
by Wright & Brown
Attys.

(No Model.) 4 Sheets—Sheet 2.

C. V. WOERD.
MACHINE FOR ROUGHING OUT PINIONS FOR WATCHES.

No. 320,992. Patented June 30, 1885.

Witnesses.
A. L. White
H. Brown

Inventor
C. V. Woerd
by Wright & Brown
Attys.

N. PETERS, Photo-Lithographer, Washington, D. C.

(No Model.)   4 Sheets—Sheet 3.

C. V. WOERD.
MACHINE FOR ROUGHING OUT PINIONS FOR WATCHES.

No. 320,992.   Patented June 30, 1885.

WITNESSES:
A. L. White
H. Brown

INVENTOR:
C. V. Woerd
by Wright Brown
Attys.

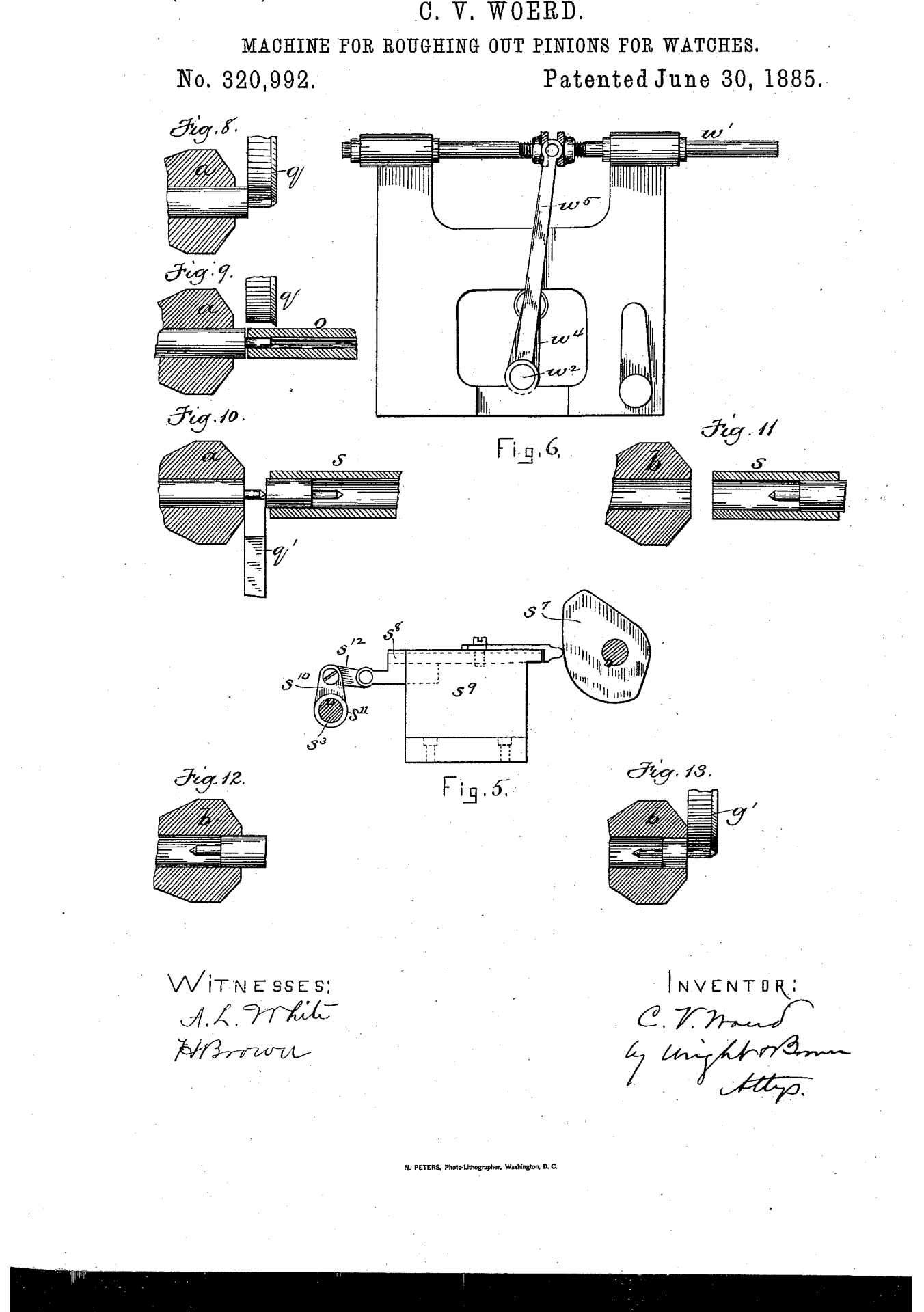

(No Model.) 4 Sheets—Sheet 4.

C. V. WOERD.
MACHINE FOR ROUGHING OUT PINIONS FOR WATCHES.

No. 320,992. Patented June 30, 1885.

UNITED STATES PATENT OFFICE.

CHARLES V. WOERD, OF WALTHAM, MASSACHUSETTS.

MACHINE FOR ROUGHING OUT PINIONS FOR WATCHES.

SPECIFICATION forming part of Letters Patent No. 320,992, dated June 30, 1885.

Application filed April 14, 1885. (No model.)

*To all whom it may concern:*

Be it known that I, CHARLES V. WOERD, of Waltham, in the county of Middlesex and State of Massachusetts, have invented certain new and useful Improvements in Machines for Roughing Out Pinions, Arbors, and Staffs for Watches, &c., of which the following is a specification.

This invention relates to machines for roughing out pinions, arbors, and staffs for watches by forming the ends or journals of such parts from a rod or blank, leaving a cylindrical enlargement between said journals to be afterward finished as desired.

The invention consists in the combination of two chucks standing side by side, each adapted to grasp and rotate a piece of wire, two cutters accompanying the first chuck, whereby the projecting end of a rod held and rotated by the chuck is turned down to form one of the journals of a pinion, arbor, or staff, and the rod is severed at a distance from the turned-down portion, thus forming a blank having one end reduced; a reciprocating grasping device, which grasps the rod by its reduced end and pulls it outwardly through the chuck before the blank is severed from it; a tube or carrier which is forced upon the projecting end of the rod after it is moved forward and before it is severed from the rod; mechanism for moving said carrier laterally and at the same time giving it a half-rotation, whereby the blank is brought into line with the center of the other chuck with the reduced end nearest to said chuck; an ejector, whereby the reduced end of the blank is pressed into the second chuck, leaving the unreduced end projecting; and a cutter accompanying the second chuck, whereby the projecting end of the blank is reduced like the other end.

The invention also consists in certain improvements in the construction of the chucks, all of which I will now proceed to describe.

Figure 1:
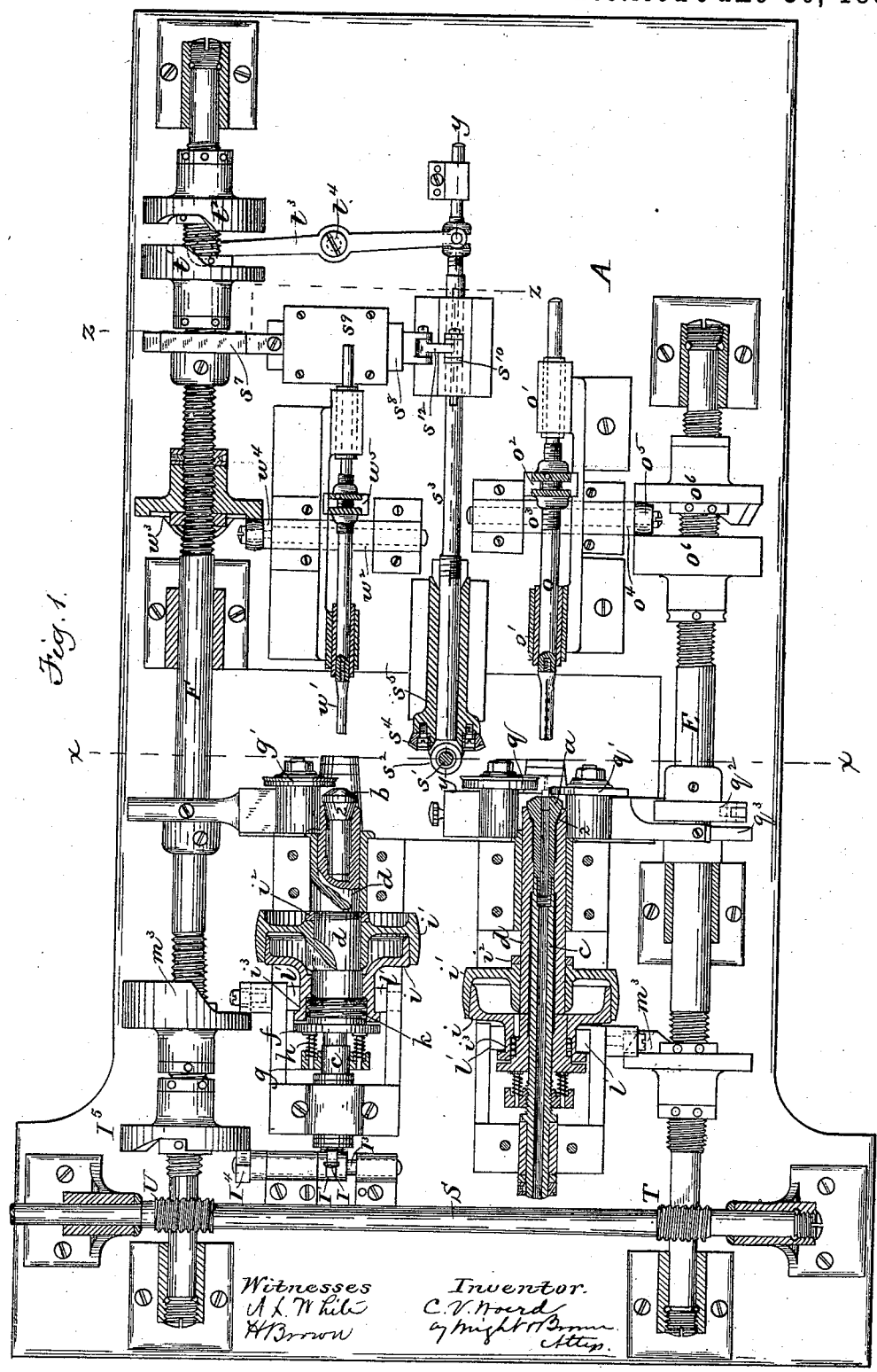
Figure 2:
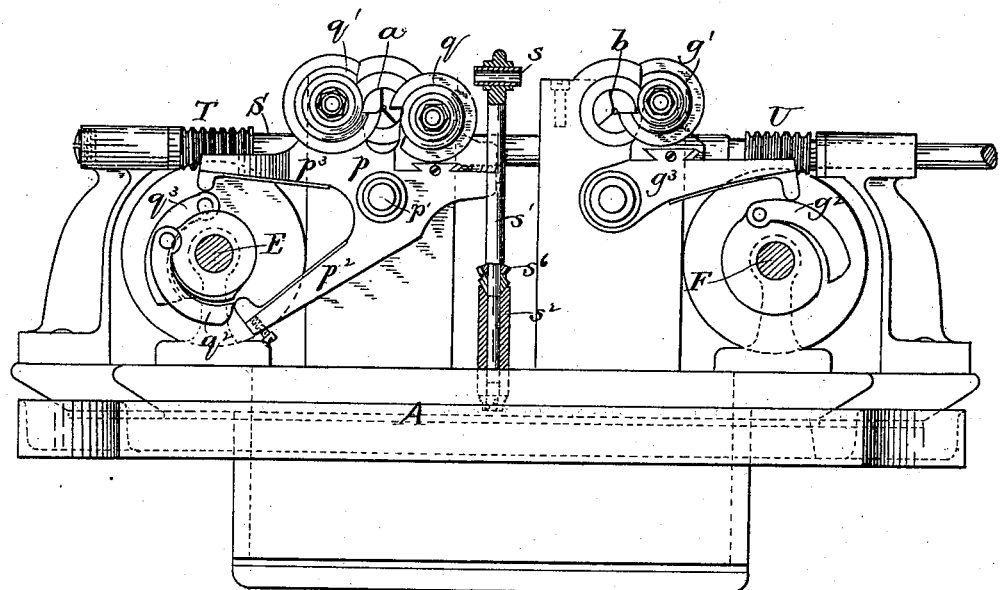
Figure 3:
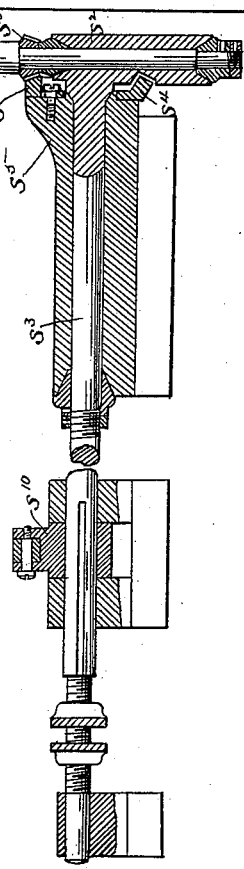
Figure 4:
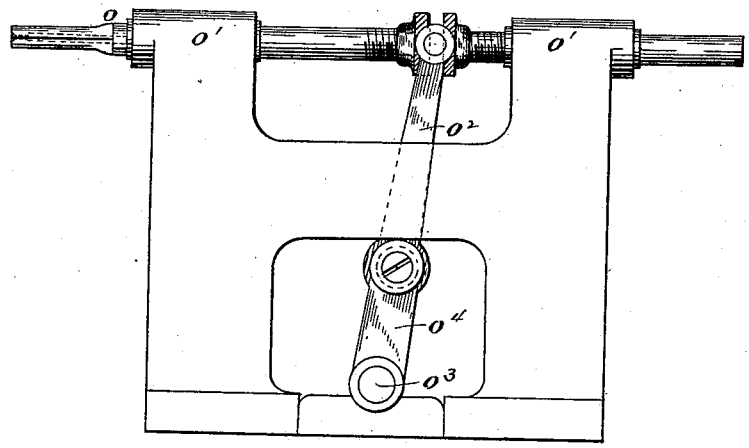
Figure 7:
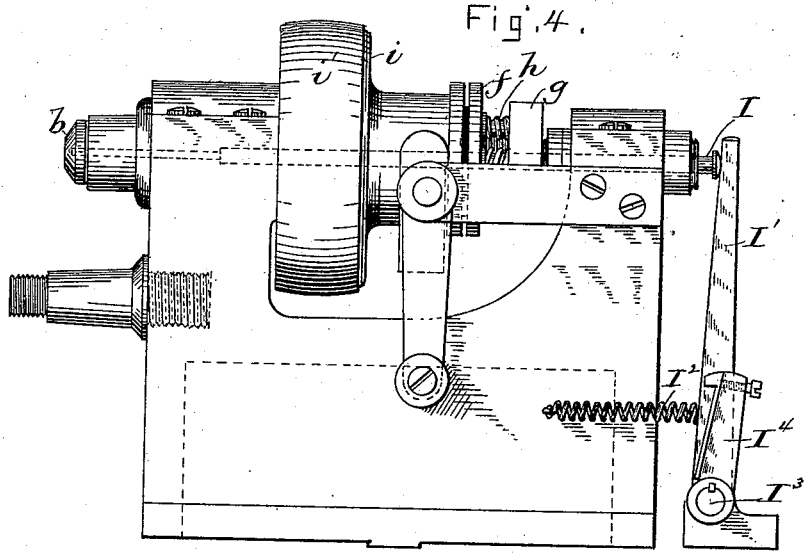

Of the accompanying drawings, forming a part of this specification, Figure 1 represents a plan view and partial horizontal section of my improved machine. Fig. 2 represents a section on line $x\ x$, Fig. 1. Fig. 3 represents a section on line $y\ y$, Fig. 1. Fig. 4 represents a side view of the feeding-rod and a part of its operating mechanism. Fig. 5 represents a section on line $z\ z$, Fig. 1. Fig. 6 represents a side view of the plunger that moves the blank into the second chuck. Fig. 7 represents a side elevation of the second chuck and the mechanism for operating the same and for ejecting the completed blank therefrom. Figs. 8, 9, 10, 11, 12, and 13 are views representing different stages of the operation.

In the drawings, A represents a fixed supporting bed or base, on which are two headstocks supporting the chucks $a\ b$, said headstocks being located side by side, with both chucks facing in the same direction. Each chuck is composed of a tube split at its outer end to form spring-jaws having external inclined surfaces, 2. Each chuck is secured to one end of a tube, $c$, the other end of which is journaled in the rear portion of the headstock, and capable of rotating with the chuck.

$d$ represents a tube which incloses a part of the tube $c$, and is movable lengthwise thereon, and is journaled in the forward portion of the head-stock, so as to be capable of rotating with the chuck and the tube $c$. The tubes $c\ d$ are provided, respectively, with collars $f\ g$, between which are interposed two or more spiral springs, $h\ h$, adapted to press the sliding tube $d$ forward, so that its outer end will normally bear upon the inclines of the chuck-jaws and cause them to grasp a rod inserted in the orifice of the chuck.

$i$ represents one member of a friction-clutch adapted to rotate with and slide on the sliding-tube $d$. The other member, $i'$, of the said clutch is journaled on the tube $d$, so as to be capable of rotating independently thereof when disengaged from the member $i$, and bears against a collar, $i^2$, affixed to said tube. The member $i'$ is formed as a pulley on which a driving-belt runs. The sliding member $i$ is provided with a flanged sleeve, $i^3$, and is pressed toward the member $i'$ by a spring, $k$. The springs $h\ h$, pressing constantly against the clutch members, hold the hub of the member $i'$ against the collar $i^2$ on the sliding tube $d$, but as said tube rotates with the clutch members there is no rubbing contact between said hub and collar.

In Letters Patent granted to me November 28, 1882, No. 268,340, I have shown a clutch and operating mechanism therefor similar in all respects to that above described, excepting that the hub of the member $i'$ of the clutch was journaled on the fixed sleeve or bearing in which the sliding tube $d$ rotates, and bore against a non-rotating shoulder on said sleeve. The pressure of the hub against said non-rotating sleeve by the springs produced an objectionable degree of friction, which is entirely overcome by journaling the member $i$ directly on the tube $d$, and supporting it by the collar $i^2$, rotating with said tube. A bifurcated lever, terminating in short-arms $l'$ $l'$, bearing on the flange of the collar $i^3$ of the sliding member, and pivoted to fixed supports, is moved by means of a cam, $m^3$, at regular intervals, so as to first push the sliding member of the clutch away from the other member and thereby stop the rotation of the chuck, and, secondly, to press the flanged sleeve $i^3$ against the flange $f$ of the sliding tube $d$, and thereby move said tube backwardly and cause its outer end to release the jaws of the chuck.

$o$ represents a reciprocating feeding-rod, which is supported in fixed guides or bearings in line with the center of the chuck $a$, and is moved longitudinally by means of a lever, $o'$, attached to a rock-shaft, $o^3$, which is mounted in fixed bearings on the bed A, and is provided with an arm, $o^4$, having a stud or roller, $o^5$, which projects between two cam-sections, $o^6$ $o^6$, on the shaft E, the space between said sections forming a cam-groove which reciprocates the rod $o$. The end of the rod next to the chuck $a$ is split to form spring-fingers, which grasp the projecting reduced end of a rod or wire in the chuck $a$ after said wire has been acted on by the reducing cutter, as hereinafter described, and draw the rod forward through the chuck until it is in position to be acted on by the cutter which severs the blank from the rod. The feeding movement of the reciprocating rod $o$ is effected while the chuck-jaws are open, and the movement of said rod, that engages its fingers with the reduced end of the blank, takes place while the jaws are closed upon the wire.

$q$ $q'$ represent cutters arranged to act alternately on the end of the wire projecting from the chuck $a$. These cutters are mounted on a rocking lever, $p$, pivoted at $p'$ to the headstock C, and provided with arms $p^2$ $p^3$, bearing, respectively, on cams $q^2$ $q^3$ on the cam-shaft E, said cams oscillating the lever $p$ so as to first present the cutter $q$ to the projecting portion of the wires, reducing said wire and forming a pivoted journal or spindle, $r$, thereon, as shown in Fig. 8. The cutter $q$ is then moved away, and before the cutter $q'$ reaches the wire the latter is fed along by the rod $o$, so that the cutter $q'$ severs the wire at a suitable distance from the portion reduced by the cutter $o$. A blank is thus formed which has the full diameter of the wire at one end and is reduced at its other end, as shown in Fig. 10. Before the blank is completely severed from the wire a tubular carrier, $s$, moves upon and receives it, as shown in Fig. 10, and moves it after it is severed to a point in line with the center of the chuck $b$. The carrier is mounted on an arm, $s'$, which is journaled so as to rotate in a holder, $s^2$, which is attached to a horizontal rock-shaft, $s^3$. The oscillation of the rock-shaft, effected as hereinafter described, causes the arm $s'$ to oscillate, so as to move the carrier $s$ alternately from one chuck to the other. A bevel-gear, $s^4$, attached rigidly to one end of a sliding sleeve or bearing, $s^5$, in which the rock-shaft is mounted, meshes with a bevel-pinion, $s^6$, on the arm $s'$, and causes said arm to make a half-rotation while it is swinging from one chuck to the other. The result of this partial rotation is to turn the carrier end for end, so that the reduced end of the blank, which pointed outwardly from the chuck $a$ at the commencement of the swinging movement of the carrier, points inwardly toward the chuck $b$ at the close of said movement, as shown in Fig. 11, and is ready to be thrust into said chuck by the ejector, hereinafter described, leaving the unreduced end of the blank projecting outwardly for the action of the last cutter.

The sliding sleeve $s^5$, in which the rock-shaft is journaled, is movable in guides on the bed, and is reciprocated by means hereinafter described, so that the carrier is moved endwise toward and from each chuck, while it stands in line therewith. These movements cause the carrier first to move upon the unsevered blank, and then to recede with the severed blank from the chuck $a$ before moving over to the chuck $b$, and thereafter to move first toward and then away from the chuck $b$ after the blank has been forced into said chuck by the ejector, hereinafter described. The rock-shaft is rocked or oscillated by means of a cam, $s^7$, on the shaft F, a slide, $s^8$, movable in a guide-block, $s^9$, on the bed A, and pressed by a spring against said cam, and an arm, $s^{10}$, on a collar, $s^{11}$, on said rock-shaft connected with said slide by a link, $s^{12}$. Said collar is connected with the rock-shaft by a feather on the one and a groove in the other, so that the rock-shaft is free to move lengthwise independently of the collar. The endwise movements of the rock-shaft are effected by means of a cam-groove between two cam-sections, $t'$ $t^2$, on the shaft F, and a lever, $t^3$, pivoted at $t^4$ to the bed and engaged at one end by a stud or roller with the cam-sections, and at the other end with two collars on the rock-shaft.

When the carrier is in line with the chuck $b$ and moved up to it, a plunger, $w'$, is moved forward, enters the carrier, and forces the blank through the carrier, inserting its reduced end into the space between the opened jaws of the chuck $b$, which jaws at once close on the blank. The plunger then withdraws from the carrier, and the latter is withdrawn from the chuck $b$, leaving the larger end of the blank projecting from said chuck, as shown in Fig. 12. The plunger is reciprocated by means of a rock-shaft, $w^2$, journaled in a bearing on the bed A, a cam, $w^3$, against which a stud or roller on an arm, $w^4$, on the rock-shaft, $w^2$, is pressed, and a longer arm, $w^5$, on said rock-shaft engaged with two collars on the plunger. A cutter, $g'$, is then moved forward by a cam, $g^2$, on the shaft F acting on a lever, $g^3$, supporting said cutter, which is thus caused to reduce the projecting end of the blank, as shown in Fig. 13.

The completed blank is removed from the chuck $b$ by an ejector, I, which is forced into the chuck by an arm, I', bearing on its rear end, and a spring, $I^2$, which forces the arm and ejector forward when the jaws of the chuck $b$ open. The arm $I^2$ is attached to a rock-shaft $I^3$, having an arm $I^4$ which bears against a cam $I^5$ on the shaft F.

The shafts E F are rotated by a driving-shaft, S, engaged with the cam-shafts by worm-gears T U.

I do not claim the described construction of the chucks, nor the mechanism for alternately closing and releasing the spring-jaws; nor do I claim, broadly, the combination of the two chucks, the cutters accompanying the same, and a carrier which transfers the blanks automatically from one chuck to the other, as said combination is shown in a former patent granted to me, the chucks being oppositely faced, and the carrier being incapable of rotation.

I claim—

1. In a machine for roughing out pinions, &c., the combination of two chucks located side by side and facing in the same direction, cutters and mechanism to operate them, substantially as described, a carrier mechanism, substantially as described, whereby said carrier is engaged with a blank projecting from one chuck, swung over to the other chuck, and at the same time semi-rotated, and a plunger which forces the blank from the carrier into the second chuck, as set forth.

2. The combination, with the two chucks, arranged as described, of the rock-shaft having the holder $s^2$, mechanism to oscillate the rock-shaft and reciprocate it longitudinally, the sleeve $s^5$, which moves longitudinally with the rock-shaft, the bevel-gear $s^4$, affixed to said sleeve, and the carrier-arm journaled in the holder and provided with the carrier $s$ and with pinion $s^6$, meshing with the bevel-gear $s^4$, as set forth.

3. The combination, with the chuck $a$ and the accompanying cutters, $q\ q'$, of an external feeding-rod $o$, having spring-fingers formed to grasp a blank, and mechanism, substantially as described, for reciprocating said rod, as set forth.

4. The combination of the chuck having the spring-jaws, the sliding tube $d$, adapted to close said jaws and permit them to open, the spring-pressed clutch composed of the members $i\ i'$, the one engaged, as described, with the tube $d$, and the other journaled on said tube, and bearing against a shoulder, $i^2$, affixed thereto, as set forth.

In testimony whereof I have signed my name to this specification, in the presence of two subscribing witnesses, this 6th day of April, 1885.

CHAS. V. WOERD.

Witnesses:
C. F. BROWN,
J. H. NEAL.